United States Patent [19]
Heller et al.

[11] Patent Number: 4,646,137
[45] Date of Patent: Feb. 24, 1987

[54] METHOD OF PRODUCING A MODULATED CHROMINANCE SIGNAL WITH SUPPRESSED CARRIER AND COLOR CARRIER MODULATOR FOR PERFORMING THE METHOD

[75] Inventors: Arthur Heller, Eichenried; Friedrich Gierlinger, Markt Indersdorf; Alfred Schaumberger, Olching, all of Fed. Rep. of Germany

[73] Assignee: U.S. Philips Corporation, New York, N.Y.

[21] Appl. No.: 638,133

[22] Filed: Aug. 6, 1984

[51] Int. Cl.⁴ .............................................. H04N 11/06
[52] U.S. Cl. ........................................... 358/23; 332/44
[58] Field of Search ...................... 358/23, 24, 25, 160, 358/186; 332/44

[56] References Cited
U.S. PATENT DOCUMENTS
4,393,395 7/1983 Hacke .................................... 358/23

FOREIGN PATENT DOCUMENTS
0078052 5/1983 European Pat. Off. .
59-189756 10/1984 Japan .

Primary Examiner—Michael A. Masinick
Attorney, Agent, or Firm—Thomas A. Briody; Jack Oisher; William J. Streeter

[57] ABSTRACT

A method of producing a modulated chrominance signal with suppressed carrier. A square-wave carrier signal and a color information signal in the form of a sequence of digitally encoded amplitude values are applied to a modulator arrangement. The clock frequency for the amplitude values is an integral multiple of the color carrier frequency and is phase-locked thereto. Each bit of the amplitude values is inverted during one half cycle of the carrier and not inverted in the subsequent half cycle. A first and a second value, respectively are added to the values obtained thus, these first and second values being calculated such that also for input and/or output signal values which are located at a distance from the drive mean values at the input and output ends a total carrier suppression is achieved for the desired input signal level. The modulated analog chrominance signal is available after digital-to-analog conversion.

4 Claims, 5 Drawing Figures

METHOD OF PRODUCING A MODULATED CHROMINANCE SIGNAL WITH SUPPRESSED CARRIER AND COLOR CARRIER MODULATOR FOR PERFORMING THE METHOD

The invention relates to a method of producing a modulated chrominance signal with suppressed carrier with the air of a modulator to which a carrier signal to be modulated and a modulating colour information signal are applied.

Generally known modulators with carrier suppression have for their object, for example in a PAL encoder, to produce the ultimate chrominance signal from the colour difference signals U and V and the applied colour carrier, to which the luminance signal is then added. A further field of usage is the generation of test line signals which are also formed from luminance signal components and superimposed chrominance signals (20T-pulse, delayed step).

In both fields of usage a high stability with time is required for the modulation process. It is of prime importance that for each signal level of U and V (=envelopes) which produce a "colourless" picture element, the carrier is suppressed reliably at the modulator output.

Faulty carrier suppression results in colour fog in colourless picture portions or otherwise in colour errors in coloured portions. With test line generators such instabilities or carrier residues produce impermissible measuring signal distortions, which renders an accurate measurement impossible.

In accordance with the prior art, colour carrier modulators may be constructed as analog ring modulators (double-sideband modulators with carrier suppression). This requires a great deal of effort and cost to obtain the required symmetry and temperature compensation in order to accomplish the required level stability and carrier suppression. This holds to a still greater extent for test line generators.

SUMMARY OF THE INVENTION

The invention has for its object to provide a a method for producing a chrominance signal having low constructional cost and design efforts and avoiding elaborate adjusting procedures, where extremely stable levels and a reliable suppression of unwanted colour carrier portions are guaranteed. To that end the method according to the invention is characterized in that the carrier signal is applied in the form of a square-wave signal and the modulating signal as a sequence of digital amplitude values, each encoded in m bits, to the modulator, the repetition frequency of these amplitude values corresponding to an integral multiple of the frequency of the carrier signal and being phase-locked thereto. Each bit of the digitally encoded amplitude value is inverted during one half cycle of the carrier signal and is not inverted during the subsequent half cycle. Each bit thus obtained is added to a signal which has the value $W_i = 2A_x + 1 + Y - Z$ for the duration of the inverting mode and the value $W_n = Y - Z$ during the non-inverting mode. The digital signal obtained by means of this adding operation is converted into an analog signal for producing the modulated chrominance signal. The full carrier suppression at the modulator output is achieved for the amplitude value $A_x$ which is situated with a different Y from the drive mean value at the input side of the modulator, and the output signal level with suppressed carrier then produced being situated with a difference Z from the drive mean value at the output side of the modulator.

The invention also relates to a colour carrier modulator for performing the method, a first embodiment of the invention being characterized in that it comprises means for applying each bit of the digitally encoded amplitude value to a corresponding first input of a binary added through a logic element which is switched by the carrier signal between the inverting and the non-inverting switching states. A carrier signal-controlled changeover device is connected to a second input of the binary added to apply alternately the values $W_i$ and $W_n$ thereto. M outputs of the binary adder are connected to the inputs of a digital-to-analog converter.

In a second, preferred embodiment of the invention the colour carrier modulator comprises means for applying the digitally encoded amplitude values and the carrier signal to $m+1$ address lines of a programmable read-only memory, m data output lines of the read-only memory being connected to the inputs of a digital-to-analog converter, the output value for the amplitude value $A_x$ being programmed in this memory for full carrier suppression.

Advantageously, the colour carrier modulator for amplitude values which differ less than a selectable amount from the amplitude value $A_x$ produces an output value programmed in the read-only memory for full carrier suppression.

DESCRIPTION OF THE FIGURES

The invention will now be described in greater detail by way of example with reference to the accompanying drawing, in which:

FIG. 1 shows the first step in the solution according to the inventive idea, namely the application to a modulator 1 of digital or digitized signals, that is to say a carrier T in the form of a square-wave signal to one input and an envelope H of a modulating colour information signal in the form of an m-bit long word sequence to a further input of the modulator 1. An m-bit long output word sequence is then available at the output of this modulator. In FIG. 1 the digital input and output word sequences, respectively are shown as equivalent analog value sequences. The digitally encoded amplitude values of the signal H are clocked by means of an integral multiple of the frequency of the carrier T, the repetition frequency of the clock signal being phase-locked thereto. After conversion of the output word sequence in a D/A converter 2 (see FIG. 2), a time and amplitude-continuous output signal is produced from the output signal of FIG. 1, which is shown as quantized, through a filter, not shown. The same holds of course also for the output signals shown in FIGS. 4 and 5. FIG. 1 also shows the value $A_x$, which is a predetermined input amplitude value for which the full carrier suppression is achieved and which is situated with a difference Y from the drive mean value at the input side. The output amplitude value $A_m$ with suppressed carrier then produced differ by a value Z from the drive mean value at the output side. For both drive mean values the quantity $2^{m-1}$ has been taken, but $2^{m-1}-1$ might alternatively have been taken. Y and Z are of importance for the conception, described hereinafter, of the digital modulator. Generally, for the benefit of an optimum drive and consequently an optimum resolution, the deviations Y and Z, respectively will be made equal to zero, if possible, or at least very small, but on the other hand they are considered to be different from zero in all examples to represent the general case.

Figure 1:
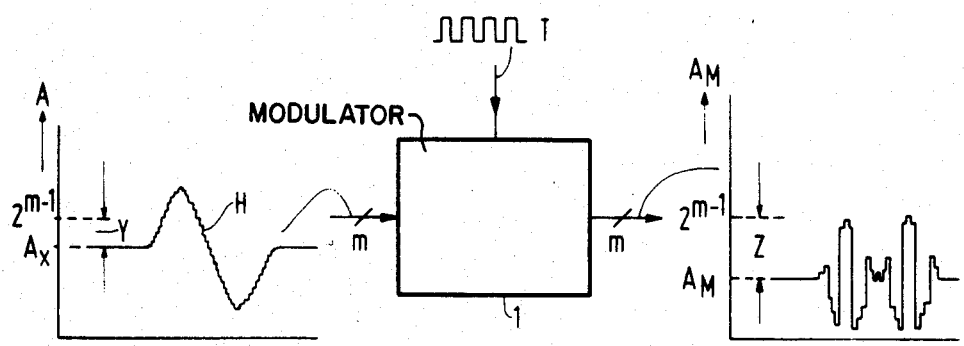
FIG. 1 is a schematical representation of the digital input and output signals of the modulator provided in accordance with the invention and their relationship to each drive mean value.
Figure 2:
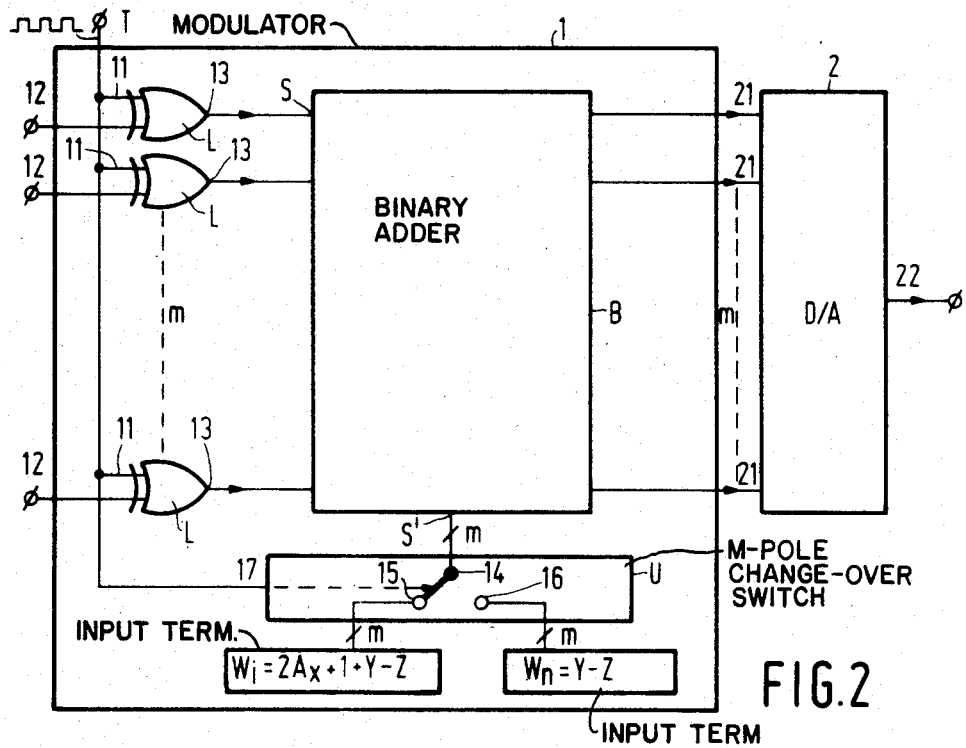
FIG. 2 is a general block diagram of a first embodiment of the modulator according to the invention.

The digital modulator shown schematically in FIG. 2 corresponds to the block 1 in FIG. 1. The digital double-sideband modulation with carrier suppression is then effected as follows:

First the digitally encoded envelope signal—represented by the m-bit long word sequence—is reflected from the drive mean value $2^{m-1}$ in each second half-cycle of the carrier T. This is effected by m logic elements L which are alternately switchable by means of their control inputs 11 on which the carrier T is impressed into the inverting or the non-inverting switching states between their inputs 12, to which the modulating signal is applied, and their outputs 13. EXCLUSIVE-OR or EXCLUSIVE-NOR gates are very suitable for use as the logic elements L.

The envelope signal thus reflected at the outputs 13 of the logic elements L would, if it were applied to a D/A converter, by already a double-sideband modulated signal, although it would be reset with a plurality of imperfections and restrictions. First the deviations Y and Z must be zero, but also then a full carrier suppression would not be obtained, the best possible result being a residual carrier of one least significant bit for an envelope value $Z_x=2^{m-1}$. (By respectively reflecting or inverting $A_x=2^{m-1}$, the value $\overline{A}_x=2^{m-1}-1$ is produced, which differs from $X_x$ by 1). Assuming Y and Z to have zero values, to correct for this residual carrier the value 1 must be added in each inverting state of the logic elements L to the outputs thereof 13 and the value 0 in each non-inverting phase. If in contrast therewith Y and/or Z are assumed to differ from zero, then in accordance with a comprehensive calculation, not shown further, the values $W_i=2A_x+1+Y-Z$ as the term to be added for the inverting phase and $W_n=Y-Z$ as the term to be added for the non-inverting phase of the logic elements L are obtained for a complete suppression of the carrier any excess value occurring when adding by $W_i$ (bit$_{m+1}$ in the sum) need not be further taken account of.

In the practical implementation of FIG. 2, an m-pole change-over switch U on whose control input 17 the carrier T is impressed, is used for the alternate application of the two terms $W_i$ or $W_n$ through its respective inputs 15 and 16, whereas its master contact 14 is connected to an adding input S' of a binary adder B. A further adding input S of the binary adder B is connected to the alternately reflected or non-reflected envelope signal, respectively at the outputs 13 of the logic element L. The m data output lines of the binary adder B are connected to the corresponding inputs 21 of the D/A converter 2 at whose output 22 the modulated envelope signal with fully suppressed carrier is available through a filter, not shown.

Figure 3:
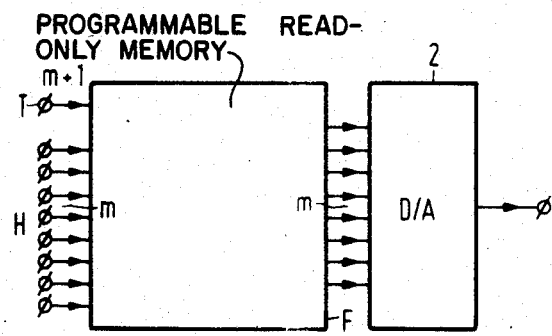
FIG. 3 shows the block diagram of a second embodiment of the modulator according to the invention.

Finally, FIG. 2 can be thought of as a digital control circuit which generates m output signals by means of m+1 controlling input lines. Since this is a switching arrangement without memories and feedback, an arrangement equivalent to FIG. 2 can be realised with a programmable read-only memory F. This equivalent, but considerably less expensive realisation of a modulator is shown schematically in FIG. 3. This requires, for example, a PROM having a length of m bits with at least m+1 address lines, so, for example, for m=8 a 4096-bit PROM in a 512×8 configuration, such as, for example, types 82 S 140, 82 S 147 or similar types. The wiring diagram of such a read-only memory can be seen from FIG. 3, more specifically this Figure shows that both the m digitally encoded envelope signals and the carrier signal T are applied to the m+1 address lines and the m data output lines of the memory F are applied to the inputs of the D/A converter 2.

The programming mode is obvious from the functions and formulae, respectively, shown in FIG. 2, for the switched terms S and S'. This is also shown in still greater detail in FIG. 4. From FIG. 4 it can be seen that one of two memory halves are activated alternately by the carrier signal T, more specifically that one half is activated when the carrier signal is high, whereas the other half is activated when the carrier signal is low, and that in each of these memory halves mutually opposite linear characteristics which compensate for the deviations Y and Z and suppress the carrier residues are programmed.

Figure 4:
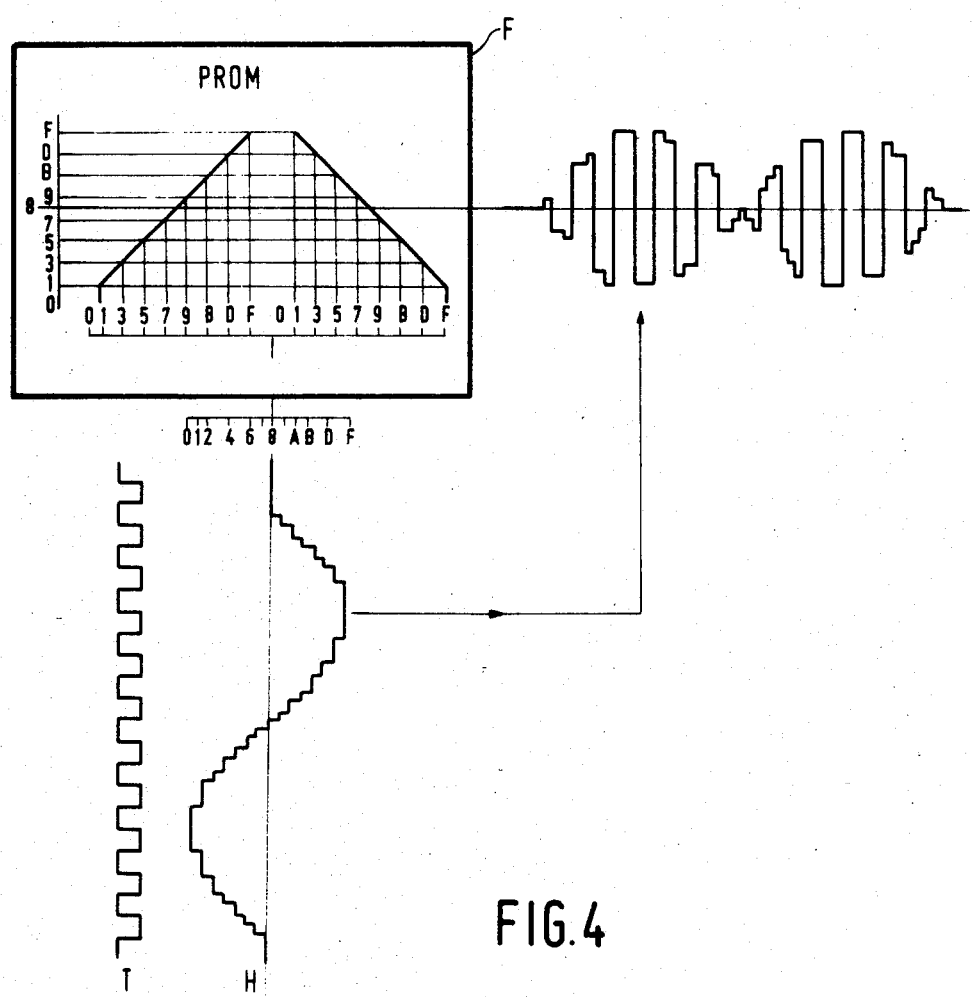
FIG. 4 shows schematical representations of the characteristics programming in the read-only memory of FIG. 3 and of the function of the modulation procedure.
Figure 5:
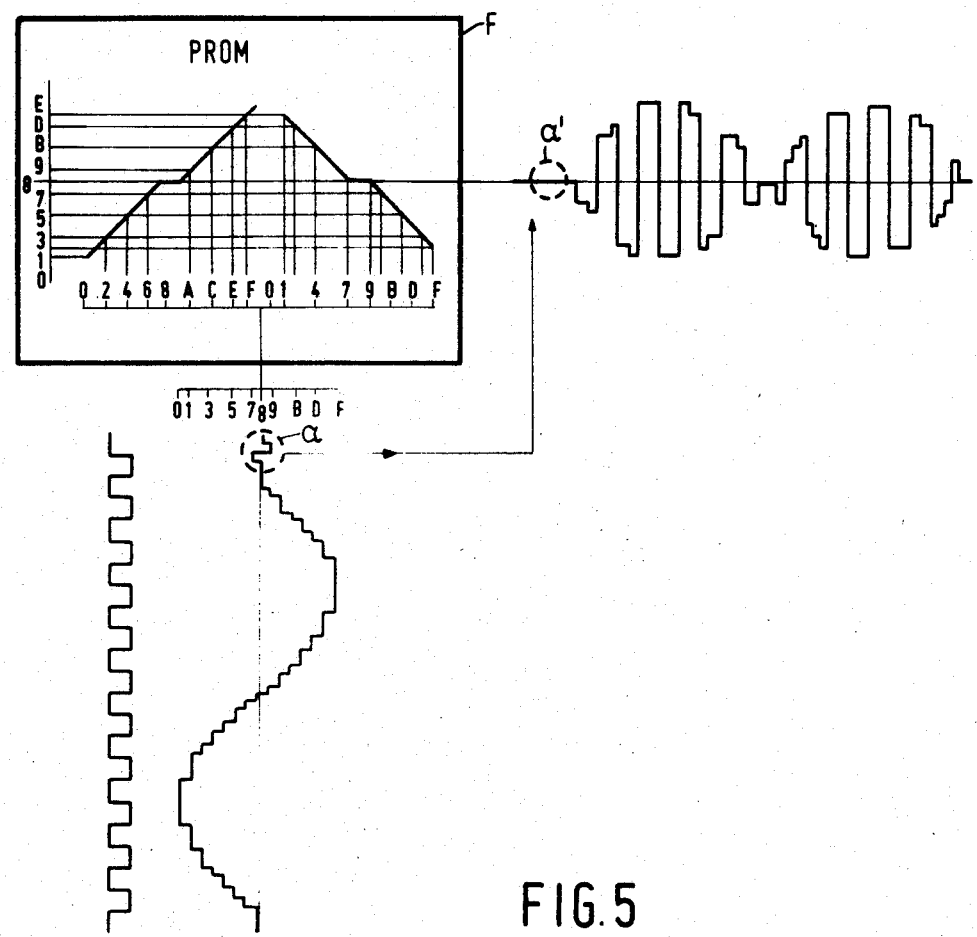
FIG. 5 is a representation as in FIG. 4, the characteristics programming having been somewhat altered.

A special modification of the two characteristics of FIG. 4 is shown in FIG. 5. It has for its object to so process small predetermined signal levels Δ around the drive zero point $A_x$, for example interfering signals, noise (α) etc. Also for them a full carrier suppression (α′) at the modulator is achieved. This is effected by programming a corresponding bend in the two characteristics, or put in a simpler way, by having the envelope values $A_x+\Delta$ and $A_x-\Delta$ produce the memory output in exactly the same manner as the (actually only carrier-suppressing) value $A_x$.

What is claimed is:

1. A method of producing a modulated chrominance signal with suppressed carrier comprising:
    generating a carrier frequency signal;
    generating a digital modulating colour information signal comprising a sequence of digital amplitude values, each of said values encoded into m bits; said modulating signal having a repetition frequency an integral multiple of said carrier frequency signal, and being phase locked thereto;
    inverting during one half of said carrier frequency signal each of said m bits of digital amplitude values, and not inverting said m bits of digital amplitude values during the remaining half of said carrier;
    adding during said one half cycle to said digital amplitude values a digital value proportional to $W_i=2A_x+1+Y-Z$ to said inverted digital amplitude values;
    adding during said remaining half of said carrier to said noninverted digital amplitude values a digital value proportional to $W_n=Y-Z$; and
    converting said digital values obtained from adding said proportional values $W_i$, $W_n$ with said digital amplitude values to an analog voltage, whereby a full carrier suppressed chrominance signal is produced, full carrier suppression being derived for an input amplitude value of $A_x$ which differs from the drive mean input value $2^{m-1}$ by Y, and the output signal in response to said value $A_x$ differs from the output value produced by said drive mean value $2^{m-1}$ by an amount Z.

2. A colour carrier modulator comprising:

a logic circuit having m inputs for receiving m binary bits representing an amplitude value of a colour signal and an input for receiving a carrier frequency signal, said logic circuit inverting each of said binary bits during one half of a cycle of said carrier frequency signal;

a binary adder connected to receive m binary bits from said logic circuit, and to receive digital data for completely suppressing said carrier frequency signal;

switching means connected to supply digital data $W_i$ for suppressing said carrier frequency signal during said half cycle proportions to $2A_x+1+Y+-Z$, and digital data $W_n$ of a second value during a remaining half cycle of said carrier frequency signal proportional to $Y-Z$, where Y represents the difference in input level $A_x$ which produces full carrier suppression from the drive mean value $2^{m-1}$ at the input of said logic circuit, and Z is the difference between the modulator output for an input of $A_x$, and the output produced by the mean input drive value $2^{m-1}$; and a digital to analog converter for converting data from said binary adder into an analog voltage, whereby a full carrier suppressed chrominance signal is produced.

3. A colour carrier modulator comprising:

a digital to analog signal converter; and a programmable read only memory connected to provide data to said digital to analog converter including a first plurality of address lines connected to receive m binary digits representing an amplitude value, and an additional address line for receiving a carrier frequency signal, said memory programmed to produce a first set of data during one half cycle of said carrier frequency signal, and another set of data during the remaining half cycle of said carrier frequency signal, said digital to analog converter in response to said data sets producing a full carrier suppressed signal when addressed by a digital signal representing a value $A_x$.

4. A colour carrier modulator according to claim 3 wherein said data sets include data which produces a full carrier suppressed signal for amplitude values which are within a predetermined range of $A_x$.

* * * * *